United States Patent [19]

Brennecke et al.

[11] Patent Number: 4,913,186
[45] Date of Patent: Apr. 3, 1990

[54] SLIDE VALVE FOR FLUID-CARRYING LINES

[76] Inventors: Hermann Brennecke, Heidelberger Landstrasse 175, D-6100 Darmstadt-Eberstadt; Horst Liere, Sandweg 4, D-6116 Eppertshausen, both of Fed. Rep. of Germany

[21] Appl. No.: 304,087

[22] Filed: Jan. 31, 1989

[30] Foreign Application Priority Data

Apr. 23, 1988 [DE] Fed. Rep. of Germany ....... 3813794

[51] Int. Cl.$^4$ ............................................. F16K 3/316
[52] U.S. Cl. .................................... 137/601; 251/212
[58] Field of Search .................. 137/599, 601, 625.33; 251/212

[56] References Cited

U.S. PATENT DOCUMENTS

| 556,549 | 3/1896 | Marichal | 251/212 |
| 2,734,529 | 2/1956 | Harrison | 137/601 X |
| 3,312,241 | 4/1967 | Bryant | 137/599 |
| 3,396,904 | 8/1968 | Janette | 251/212 X |
| 4,531,539 | 7/1985 | Jandrasi et al. | 251/212 X |
| 4,532,961 | 8/1985 | Walton et al. | 251/212 X |

FOREIGN PATENT DOCUMENTS 1052195 8/1959 Fed. Rep. of Germany .
3339441 6/1986 Fed. Rep. of Germany .

Primary Examiner—Stephen M. Hepperle
Attorney, Agent, or Firm—Edwin E. Greigg

[57] ABSTRACT

The invention relates to a slide valve for flow lines that carry fluid. The slide valve includes a stationary valve plate and two separately movable sealing plates, which like the valve plate have a plurality of flow openings formed by ribs. Oppositely disposed pressure plates, moving toward one another, each close off one-half the area of the flow openings. The division of the closing motion considerably shortens the closing time of the slide valve and also allows flow openings that can be approximately twice as large in area as the ribs.

20 Claims, 3 Drawing Sheets

SLIDE VALVE FOR FLUID-CARRYING LINES

BACKGROUND OF THE INVENTION

The present invention relates to a slide valve for fluid-carrying lines, having a stationary valve plate and two separately movable sealing plates, which like the valve plate each have a plurality of flow openings, formed by ribs, which can be selectively opened or closed by moving the sealing plates.

In German patent No. 1 052 195, a slide valve having two separately movable sealing plates is known. This slide valve, which is used above all as a regulating valve, has a valve plate with a plurality of individual openings. The openings all have the same cross section. With the sealing plates, the situation is different: Their opening cross sections increase in size in a transverse direction inside the sealing plate. The transverse directions of the increasing opening cross sections of the two plates are aligned oppositely to one another. By displacing the sealing plates, the flow cross section can thus be varied in an infinitely graduated manner. The adjustability allows only very small opening cross sections, however, in proportion to the total cross section. Moreover, fast closure of the slide is attainable only with difficulty in this valve, because the primary object here is to change the operative location of the flow.

In the present case, the intent is to develop a slide valve for pipelines in potentially explosive plants. The slide valve should close immediately if the pressure in the pipeline system increases abruptly, or if optical sensors detect light from a fire; the slide valve is intended to prevent the propagation of a wave of flame and pressure within the pipeline system.

OBJECT AND SUMMARY OF THE INVENTION

An object of the present invention is therefore to develop a slide valve that is distinguished by fast, reliable closing. When the slide valve is closed, the sealing plates and valve plates should be flameproof up to a pressure of approximately 1 MPa. A large opening cross section—which means that the ribs are narrow—is also sought, so that the external structural dimensions of the complete slide valve can be kept small.

According to the invention, this object is attained in that the opening cross sections of the stationary valve plate has approximately twice the cross-sectional area of the ribs, and that the ribs of the various sealing plates each close off approximately one-half the cross section of the flow openings; the overlapping edges of the ribs are braced both against one another and with respect to the stationary valve plate, to which end the ribs are reinforced transversely so the sliding motion and parallel to the direction of fluid flow.

The invention is accordingly based on a concept that the opening cross sections of the valve plate are closed off by two sealing plates moved parallel to and in opposite directions from one another. Because the motion is divided, each sealing plate needs to cover only half the distance to close the slide, as compared with slides of the prior art. Consequently, the closing time of this new short-stroke slide is considerably shorter. This has critical significance in potentially explosive plants.

Moreover, the ribs of the valve plates and sealing plates require only approximately one-half the height of the flow openings, minus a slight overlap. Thus, the mass for the sealing plates can be less, which further shortens their closing time.

Suitably, the stationary valve plate comprises identical halves, rotated by 180°, the ribs of which are in alignment with one another in the flow direction. This lessens the production cost of the valve.

Other advantageous characteristics set forth herein assures valve tightness, even through the sealing plates of the valve plate are spaced apart by the width of the sealing plates.

Accordingly, the valve plate comprises two halves, inside which the sealing plates are moved. Per half, they have ribs having the same kind of alignment, which face one another with their horizontal legs. The two sealing plates move in the hollow spaces between the two valve plates.

To prevent denting of the ribs of the sealing plates, the various sealing plates overlap in the closed state, and the sealing strips of the downstream sealing plate are supported directly on the ribs of the valve plate. The ribs of the upstream sealing plate, in turn, are supported on the ribs of the pressure plate and on the sealing plate. The valve plate and sealing plates thus form a stable unit.

It is also recommended that the ribs of the valve plate be provided with streamlined reinforcements. They have a substantially triangular cross section and are secured on the ribs on both sides of the valve plate. The reinforcements not only prevent denting of the combined valve plate/sealing plates component in the closed state, but they also lessen the valve-dictated throttling within the pipeline system. The flowing fluid no longer strikes the ribs frontally but instead is guided in a streamlined manner.

In the open position of the slide, the sealing strips along with the ribs and the flow guide plates make for a closed cross-sectional contour of the ribs that hinder the flow. This closed external form greatly reduces the threat of cavitation at transition points.

The travel limitation of the sealing plates is located in the vicinity of the drive units.

Upon closure of the short-stroke slide, the greatly accelerated sealing plates are braked over a distance of approximately 1 mm. The elastic impact between the stop elements causes recoiling of the sealing plates. To prevent opening, the drive units have a separate catch in the closed position. The locking means are not unlocked again until an opening mechanism of the short-stroke slide opens them.

This mechanism is constructed in such a way that it is moved only in the opening operation. Once the opening operation is completed, it moves to its position of repose, which presents no hindrance to the closing operation.

It is within the scope of the invention to dispose the two sealing plates not inside but instead outside the valve plate; either one sealing plate is on each side of the valve plate, or both sealing plates are on one side of the valve plate. However, in that case the intermediate ribs that perform the function of the aforementioned sealing strips must be provided on the valve plate or on the sealing plates.

As a further variant instead of the slide valve having oppositely parallel acting sealing plates, a rotary slide can be used. Similarly to the aforementioned short-stroke slide, this rotary slide has a rigid stationary valve plate and two pivotable sealing plates. Here, the opposed rotary motion of the individual sealing plates is utilized in order to divide the closing stroke. The differences between the two variants are substantially in their cross-sectional shapes and in the disposition of the drive units. The circular sealing plates of the rotary slide may have triangular cross sections, cross sections in the form of sectors of a circle, or circular annular cross sections. With such a slide, the drive units may be disposed at a tangent, which saves space. Both parallel slides and rotary slides have the same advantages over the prior art.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
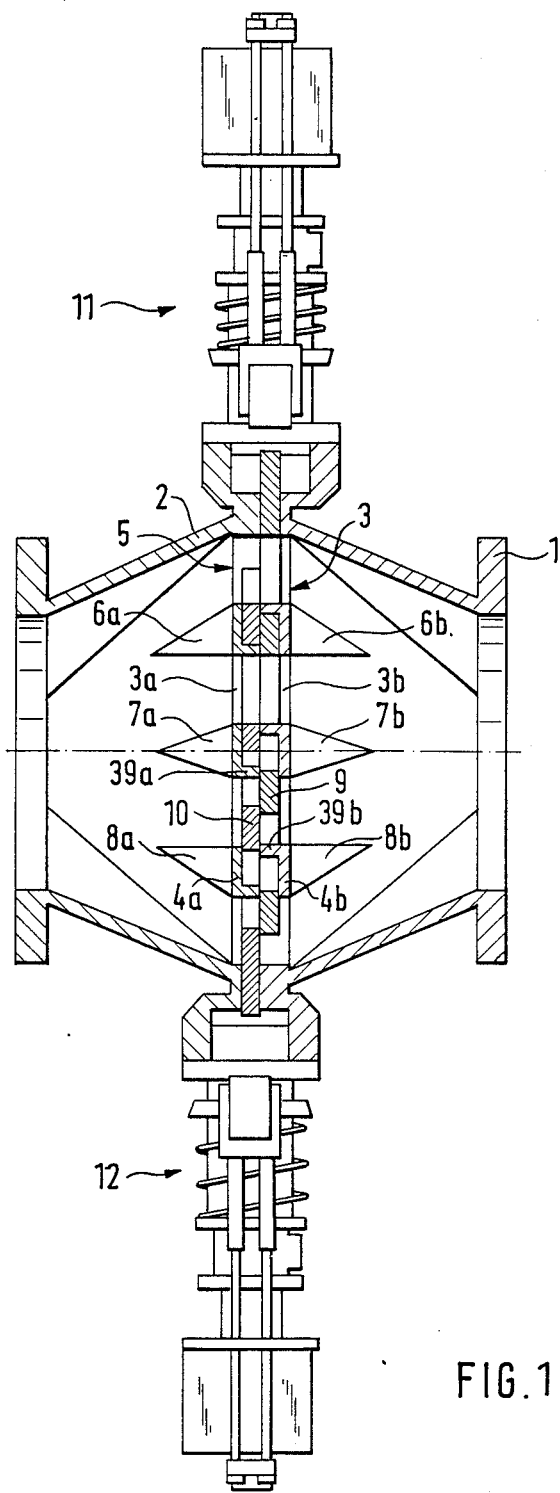
FIG. 1 is a fragmentary sectional view of a short-stroke slide, in which the upper half of the slide is shown in the open position and the lower half is shown in the closed position.

FIG. 1 is a sectional view of a slide valve for a fluid-carrying pipeline. In the vicinity of their common parting line, the two housing halves 1, 2 each carry one half 3a, 3b, respectively, of one valve plate 3. Each valve plate has a number of L-shaped ribs 4a and 4b, respectively, which leave flow openings 5 open between them. The ribs are also reinforced by welded-on flow guide plates 6a, 6b; 7a, 7b; 8a, and 8b. For better guidance of the fluid, some of the flow guide plates are asymmetrical, converging as they extend away from the valve plate.

In the free spaces of the valve plate, two individual slit sealing plates 9, 10 are capable of motion relative to one another and relative to the valve plate 3, transversely to the fluid flow direction. In the open position of the slide, the ribs of the sealing plates 9 and 10 are recessed in the angular ribs 4a and 4b of the valve plate. The flow guide plates 6a, 6b; 7a, 7b; 8a, and 8b form the sealing plate ribs, and the valve plate ribs form a plurality of continuously smooth flow conduits, which minimizes the flow resistance inside the region of the valve.

To close the short-stroke slide, the sealing plates 9, 10 guided parallel beside one another are moved in opposite directions toward one another. In their closed position, their edges overlap one another and the edges of the stationary valve plate 3.

As a result of this overlap, good sealing action on the one hand and stable bracing of the sealing plate ribs with respect to the valve plate on the other are attained. This eliminates the danger that the ribs will bend open in response to a strong pressure wave.

To move the sealing plate of the short-stroke slide, drive units 11, 12 of identical structure are attached diametrically to the housing, transversely to the fluid flow direction. The drive units are mounted on flanges that are secured to the housing halves 1, 2.

Figure 3:
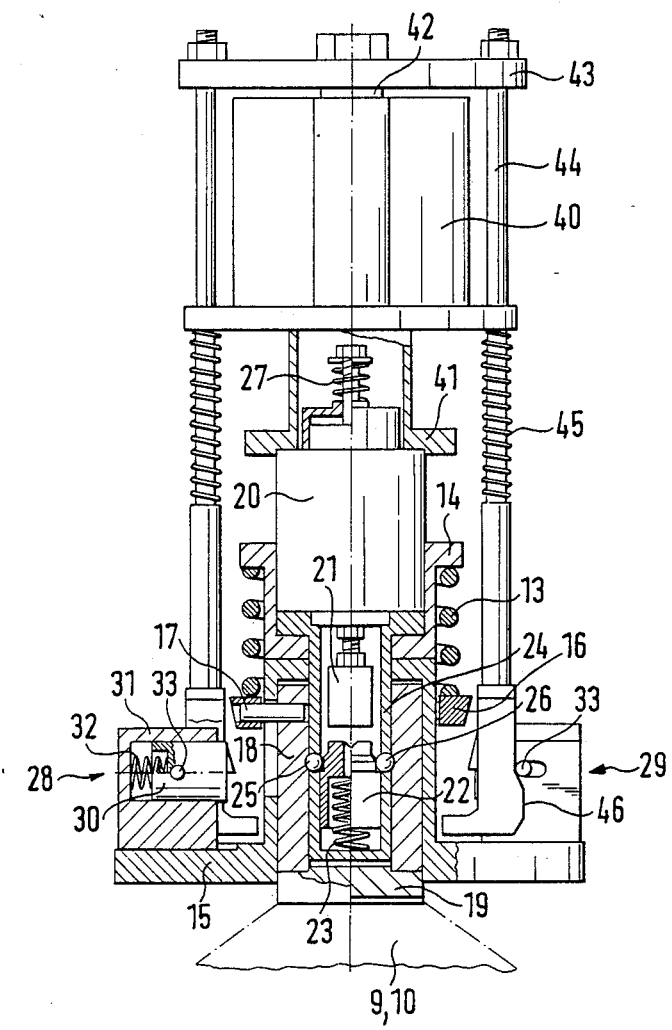
FIG. 3 is a section taken through a drive unit for a sealing plate, showing the tripping and locking mechanism.

FIG. 3 shows such a drive unit, in fragmentary sections. For moving the sealing plate 9 or 10, a prestressed compression spring 13 is used. Its upper end is braced on the housing parts 1, 2 via a reciprocating magnet housing 14 and a flange adapter 15.

The lower part of the compression spring rests on a detent disk 16. Via a plurality of cylindrical pins 17, the detent disk is in direct operative connection with a protective tube 18 that is connected rigidly via a disk 19 to the sealing plate 9 or 10.

An unlocking mechanism is used to release the spring force of the compression spring 13 for the closing operation. To this end, a reciprocating magnet 20 in the reciprocating magnet housing is connected to a spherical liner 24. The spherical liner 24 has a plurality of radial bores halfway up its height that accommodate detent balls 25. The detent balls are retained in their position by a locking bolt 22 that is pressed upward by a compression spring 23. This presses the detent balls 25 into an annular groove 26 in the protective tube 18 and therefore firmly holds the sealing plate counter to the closing force acting upon it.

Upon actuation of the reciprocating magnet 20, a hammer 21 strikes the locking bolt 22 counter to the force of a restoring spring 27. The locking bolt moves downward counter to the spring force of the compression spring 23, and releases the detent balls 25 in the radial direction, thereby releasing the catch between the protective tube 18 and the spherical liner 24. The short-stroke slide then closes.

Figure 2:
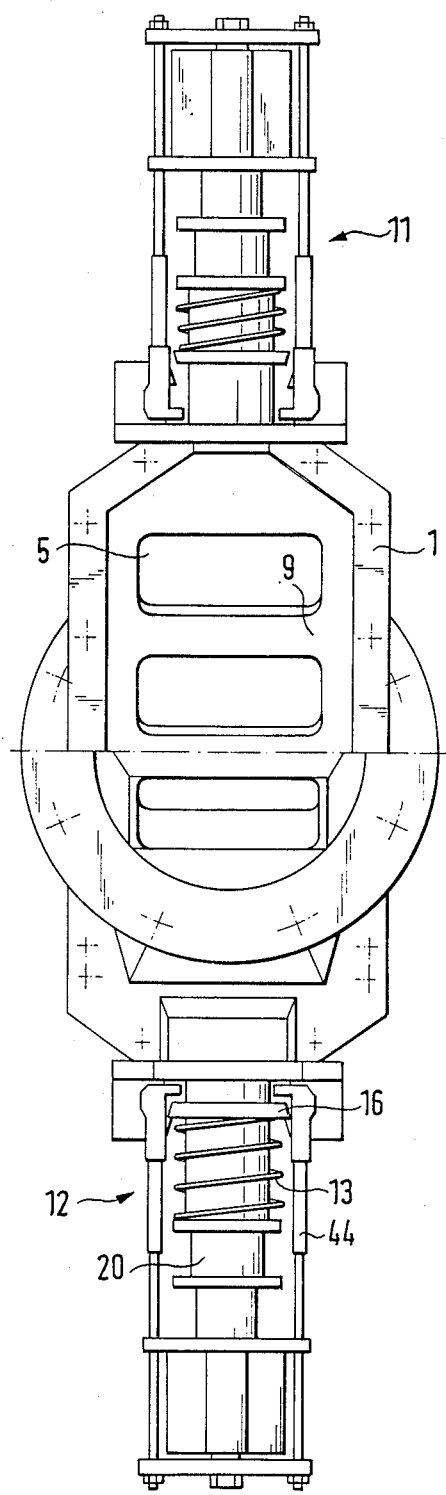
FIG. 2 is a fragmentary sectional view of a short-stroke slide seen from the front.

To prevent recoiling of the sealing plates 9, 10 after the closing operation, two oppositely disposed locking means 28, 29 of identical structure are attached to each flange adapter 15; these are shown in FIG. 3 in a sectional view on the left side and unsectioned on the right side. To this end, two bolt housings 31 are secured to the flange adapter. Detent bolts 30 that are secured against twisting via cylindrical pins 33 are seated in each bolt housing. These bolts are retained in their closing position by the spring force of the compression springs 32. In the downward motion of the detent disk 16, the detent bolts are briefly pressed backward, so that once they move past the detent disk they prevent it from moving upward. This situation is shown in the bottom portion of FIG. 2. As can be seen there, the drive unit 12 is shown with its detent disk 16 locked.

The slide valve is opened with the aid of a pneumatic cylinder 40. It is mounted on the double flange 41, which is supported on the reciprocating magnet 20. The piston rod 42, pointing upward as seen in FIG. 3, of the pneumatic cylinder 40 has a crosshead 43, in which tie rods 44 provided with hooks on its bottom end are fastened.

Now if the slide valve is to be opened, the pneumatic cylinder is subjected to compressed air, which moves the tie rods 44 and their hooks upward. The hooks of the tie rod then rest on the underside of the detent disk 16. At the same time cams 46 oppositely disposed from the hooks are provided on the back of the hooks. The cams 46 unlock the locking means 28 and 29 via the cylindrical pins 33, causing the sealing plates 9, 10 to be displaced into the opening position. The upward motion of the tie rods is terminated once the annular groove 26 of the protective tube 18 reaches the level of the detent balls 25. The detent balls 25 then re-lock the protective tube 18 with the spherical liner 24.

Finally, the compression springs 45 mounted on the tie rods move the tie rods 44, the crosshead 43 and the piston rod 42 back into its outset position shown in FIG. 3. This assures that the mass of the lifting mechanism 40-45 and the locking means 28 and 29 does not also need to be moved during the closing operation.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A slide valve for fluid-carrying lines, having a stationary valve plate with a plurality of spaced ribs (4a, 4b) therein, said stationary valve plate comprises two identical halves (3a, 3b) rotated by 180°, and said spaced ribs (4a, 4b) are in alignment with one another in a flow direction, two juxtaposed separately movable sealing plates, guided in slots in said stationary valve plate, said stationary valve plate and said sealing plates each have a plurality of flow openings therein, said flow openings in said valve plate can be selectively opened and closed by moving said sealing plates relative to said flow openings in said stationary valve plate, said flow openings (5) of the stationary valve plate halves (3a, 3b) have approximately twice the cross-sectional area of said spaced ribs (4a, 4b) therein, and said sealing plates (9, 10) each close off approximately one-half the cross section of the flow openings (5) when in a closed position, wherein overlapping edges of said valve stationary plate are supported both against one another and with respect to said spaced ribs in said stationary valve plate, and said spaced ribs are reinforced transversely to the sliding motion of said sealing plates and parallel to the direction of fluid flow through the flow openings 5 of said stationary valve plate.

2. A slide valve for fluid-carrying lines, having a stationary valve plate with a plurality of spaced ribs (4a, 4b) therein, two juxtaposed separately movable sealing plates, guided in slots in said stationary valve plate, said stationary valve plate and said sealing plates each have a plurality of flow openings therein, said flow openings in said valve plate can be selectively opened and closed by moving said sealing plates relative to said flow openings in said stationary valve plate, said openings (5) of the stationary valve plate (3a, 3b) have approximately twice the cross-sectional area of said spaced ribs (4a, 4b) therein, and said sealing plates (9, 10) each close off approximately one-half the cross section of the flow openings (5) when in a closed position and are retained in their closed position via locking mechanisms (28, 29), wherein overlapping edges of said stationary valve plate are supported both against one another and with respect to said spaced ribs in said stationary valve plate, and said spaced ribs are reinforced transversely to the sliding motion of said sealing plates and parallel to the direction of fluid flow through the flow openings 5 of said stationary valve plate.

3. A slide valve for fluid-carrying lines, having stationary valve plate with a plurality of spaced ribs (4a, 4b) therein, two juxtaposed separately movable sealing plates, guided in slots in said stationary valve plate, said stationary valve plate and said sealing plates each having a plurality of flow openings therein, said flow openings in said valve plate can be selectively opened and closed by moving said sealing plates relative to said flow openings in said stationary valve plate, said flow openings (5) of the stationary valve plate (3a, 3b) have approximately twice the cross-sectional area of said spaced ribs (4a, 4b) therein, and said sealing plates (9, 10) each close off approximately one-half the cross section of the flow openings (5) when in a closed position, said sealing plates are connected to an opening mechanism (40-45) in which at a time of a closing motion, the sealing plates (9, 10) are disconnected from said opening mechanism (40-45), wherein overlapping edges of said stationary valve plate are supported both against one another and with respect to said spaced ribs in said stationary valve plate, and said spaced ribs are reinforced transversely to the sliding motion of said sealing plates and parallel to the direction of fluid flow through the flow openings 5 of said stationary plate.

4. A slide valve as defined by claim 1, in which said spaced ribs of said stationary valve plate (3a, 3b) form sealing strips that cooperate with the sealing plates (9, 10).

5. A slide valve as defined by claim 2, in which said spaced ribs of said stationary valve plate (3a, 3b) form sealing strips that cooperate with the sealing plates (9, 10).

6. A slide valve as defined by claim 1, in which said two sealing plates (9, 10) are guided inside the valve plate (3a, 3b) in opposite directions.

7. A slide valve as defined by claim 4, in which said two sealing plates (9, 10) are guided inside the valve plate (3a, 3b) in opposite directions.

8. A slide valve as defined by claim 4, in which said spaced ribs (4a, 4b) of the stationary valve plate (3a, 3b) have approximately L-shaped cross sections, of which include leg portions that are parallel to the flow direction and which face one another to function as sealing strips.

9. A slide valve as defined by claim 7, in which said spaced ribs (4a, 4b) of the stationary valve plate (3a, 3b) have approximately L-shaped cross sections, of which include leg portions that are parallel to the flow direction and which face one another to function as sealing strips.

10. A slide valve as defined by claim 4, in which said sealing strips serve to support the sealing plate (9, 10) in the fluid flow direction when in a closed position.

11. A slide valve as defined by claim 6, in which said sealing strips serve to support the sealing plate (9, 10) in the fluid flow direction when in a closed position.

12. A slide valve as defined by claim 7, in which said sealing strips serve to support the sealing plate (9, 10) in the fluid flow direction when in a closed position.

13. A slide valve as defined by claim 5, in which said sealing strips serve to support the sealing plate (9, 10) in the fluid flow direction when in a closed position.

14. A slide valve as defined by claim 9, in which said sealing strips serve to support the sealing plate (9, 10) in the fluid flow direction when in a closed position.

15. A slide valve as defined by claim 1, in which said stationary valve plate is reinforced with flow guide plates (6a, b; 7a, b; 8a, b).

16. A slide valve as defined by claim 3, in which said spaced ribs of said stationary valve plate (3a, 3b) form sealing strips that cooperate with the sealing plates (9, 10).

17. A slide valve as defined by claim 16, in which said sealing strips serve to support the sealing plate (9, 10) in the fluid flow direction when in a closed position.

18. A slide valve as defined by claim 2, in which said two sealing plates (9, 10) are guided inside the valve plate (3a, 3b) in opposite directions.

19. A slide valve as defined by claim 3, in which said two sealing plates (9, 10) are guided inside the valve plate (3a, 3b) in opposite directions.

20. A slide valve as defined by claim 18, in which said sealing strips serve to support the sealing plate (9, 10) in the fluid flow direction when in a closed position.

* * * * *